Feb. 22, 1944. R. E. MANLEY 2,342,205
SOLVENT EXTRACTION OF OIL
Filed July 19, 1941
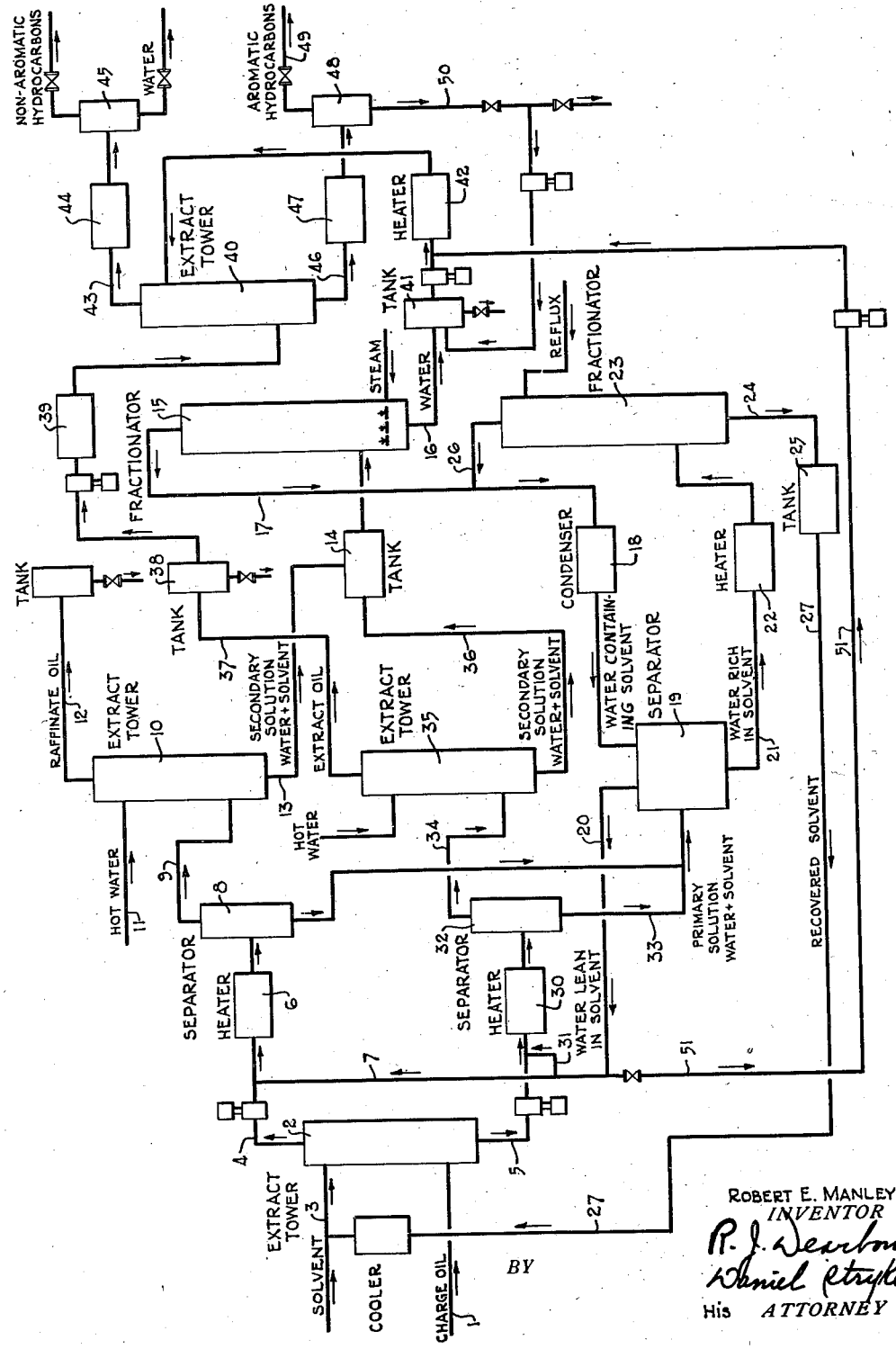
ROBERT E. MANLEY
INVENTOR
BY
His ATTORNEY Patented Feb. 22, 1944

2,342,205

UNITED STATES PATENT OFFICE 2,342,205

SOLVENT EXTRACTION OF OIL

Robert E. Manley, Yonkers, N. Y., assignor, by mesne assignments, to The Texas Company, New York, N. Y., a corporation of Delaware Application July 19, 1941, Serial No. 403,102

4 Claims. (Cl. 196—13)

This invention relates to the fractional separation of oil by extraction with a selective solvent and particularly to the fractional separation of hydrocarbon mixtures such as derived from petroleum which contain aromatic and non-aromatic hydrocarbons including aliphatic and alicyclic hydrocarbons.

The invention broadly contemplates extracting oil with a selective solvent which is substantially completely miscible with water at elevated temperature. The oil is extracted with the solvent to form extract and raffinate phases, each phase comprising a mixture of solvent and a portion of the oil. These phases are separated and separately treated with water in relatively large amount and under conditions such that a large proportion of the solvent is dissolved in the water to form a primary solution of water and solvent, rich in solvent. The extract and raffinate phases from which the primary solutions have been removed are then separately treated with an additional quantity of water so as to substantially completely remove the remaining solvent from the extract and raffinate oil respectively, thereby forming secondary solutions of water and solvent.

The primary solutions are fractionally distilled to separate water from the solvent, forming a liquid fraction consisting essentially of solvent, and a distillate fraction comprising a mixture of solvent and water. The liquid fraction of recovered solvent is utilized for the extraction of fresh feed oil.

The secondary solutions relatively lean in solvent are also fractionally distilled to form a distillate fraction in which the solvent is concentrated and a liquid fraction consisting essentially of water substantially free from solvent.

The distillate fractions relatively lean in solvent are accumulated and used for treating fresh extract and raffinate phases for the production of further quantities of the primary solutions.

The water separated from the fractional distillation of the secondary solutions may be discharged from the system or may be used as the solvent medium in the subsequent extraction of the solvent free extract oil particularly for the purpose of effecting separation of aromatic constituents therefrom in concentrated form as will be described in more detail.

The process of this invention is adapted to the treatment of relatively low boiling hydrocarbon mixtures such as naphtha or kerosene with selective solvents such as nitrobenzene, phenol, dichlorethyl ether, furfural or other furan compounds including furfuryl alcohol and tetrahydrofurfuryl alcohol, etc.

The invention is applicable to the treatment of hydrocarbon fractions such as cracked naphtha containing aromatic constituents such as benzol, toluol and xylol for the purpose of separating these aromatic constituents or mixtures thereof in a relatively concentrated form from the feed naphtha.

In order to describe the invention in more detail reference will now be made to the accompanying drawing comprising a flow diagram illustrating one mode of practicing the process of the invention.

As shown in the drawing a charge oil such as cracked naphtha is conducted from a source not shown through a pipe 1 to the lower portion of an extraction tower 2. The feed oil may be introduced to the tower at a temperature of about 70 to 90° F.

A stream of solvent such as furfural is conducted through a pipe 3 to the upper portion of the tower 2 and may be introduced thereto at a temperature of about 90 to 100° F.

The tower is advantageously packed with a suitable packing material such as Raschig rings and arranged to effect countercurrent flow between solvent and feed oil within the tower whereby the oil is subjected to countercurrent extraction with the solvent.

As a result of the extraction a raffinate phase comprising the insoluble hydrocarbon constituents including mainly paraffins collects in the upper portion of the tower 2 and is continuously discharged therefrom through a pipe 4.

Extract phase comprising constituents of the oil soluble in the solvent including aromatic and olefinic constituents collects in the lower portion of the tower and is continuously discharged therefrom through a pipe 5.

The extraction in the tower 4 is advantageously carried out under substantially atmospheric pressure or under a pressure sufficient to maintain liquid phase conditions within the tower. The actual pressure employed will depend upon the temperatures prevailing within the extraction tower.

The raffinate phase being discharged from the top of the tower and containing about 10–15% by volume of solvent is pumped under pressure through a heater 6 wherein it is heated to a temperature of about 300° F., having been first commingled with a quantity of water obtained through a pipe 7 from a source which will be described later. The raffinate phase and water are advantageously mixed in the proportion of about 0.5 to 1.0 volume of water to one volume of raffinate phase.

The heated mixture is conducted from the heater to a separator 8 maintained at about 300° F. and under pressure sufficient to maintain the mixture substantially in the liquid phase so that the mixture separates into liquid layers. The upper layer will comprise raffinate oil still retaining a small amount of solvent, i. e., about 0.5% or less, while the bottom layer comprises water containing the bulk of the solvent. The bottom layer is continuously discharged from the bottom of the separator as a primary solution of solvent in water.

The raffinate oil retaining the small amount of solvent is continuously withdrawn and conducted through a pipe 9 to the lower portion of an extractor 10 wherein it is subjected to countercurrent extraction with hot water, continuously introduced to the upper portion of the extractor through a pipe 11. The water is advantageously introduced at a temperature of about 300° F. and in the proportion of about 1 to 2 volumes of water per volume of entering raffinate oil so that the extraction in the extractor 10 is effected at substantially this same temperature thereby dissolving the remaining solvent substantially completely from the raffinate oil.

The raffinate oil substantially free from solvent is discharged through a pipe 12, while the water containing the extracted solvent is discharged from the bottom of the extractor as secondary solution through a pipe 13.

The secondary solution is conducted through the pipe 13 to a receiving tank 14 and from there is charged to the lower portion of a fractionator 15. The fractionator 15 serves as a distilling column having provision for the introduction of steam to the lower portion thereof. The bottom of the fractionator is maintained at a temperature about 215 to 225° F. while the top of the fractionator is maintained at a temperature of about 212° F., the pressure being maintained at substantially atmospheric.

Under these conditions the solvent is stripped from the bulk of the water, the water being discharged from the bottom of the fractionator through a pipe 16. This water is substantially free from solvent or at least contains only a trace or relatively small amount of solvent.

The distillate discharged from the top of the fractionator 15 comprises a mixture of water and solvent containing about 35% solvent.

This distillate is conducted through a pipe 17 and a condenser 18 from which the resulting condensate is conducted to a separator 19.

The mixture of water and solvent at a temperature of about 160° F. separates into layers within the separator 19, the upper layer comprises water relatively lean in solvent (containing, for example, about 13% by weight furfural) and it is continuously withdrawn therefrom through a pipe 20 which communicates with the previously mentioned pipe 7 and through which this water saturated with solvent is introduced to the raffinate phase passing through the pipe 4 to the heater 6 as previously described.

The bottom layer accumulating in the separator 19 comprises a mixture of water and solvent rich in solvent (for example containing about 90% by weight furfural). This mixture is continuously withdrawn through a pipe 21 to a heater 22, wherein it is heated to a temperature of about 320 to 330° F. and from there discharged into the lower portion of a fractionator 23.

In the fractionator 23 the mixture of water and solvent is subjected to fractional distillation to strip the water from the solvent forming a liquid fraction consisting of recovered solvent substantially free from water which is discharged through a pipe 24 to a tank 25. The distillate fraction comprising water containing some solvent, for example, about 45% solvent, is discharged from the top of the fractionator through a pipe 26 to the previously mentioned condenser 18.

The fractionator 23 is advantageously operated under substantially atmospheric pressure with a temperature of about 325° F. at the bottom of the tower and a temperature in the range 220 to 260° F. at the top of the tower. The desired temperature conditions are maintained by the introduction of a suitable reflux liquid to the upper portion of the tower. This reflux liquid advantageously comprises a portion of the relatively cool feed to the heater 22.

The recovered solvent collecting in the tank 25 is conducted through a pipe 27 for return to the upper portion of the extraction tower 2.

The extract phase discharged from the extraction tower 2 and containing about 90% solvent by volume is treated in a similar manner. Thus, it is forced by means of a pump through a heater 30 having first been commingled with the requisite quantity of water or water saturated with solvent as obtained from a pipe 31 communicating with the previously mentioned pipe 20.

The mixture is similarly heated to a temperature of about 300° F. and conducted to a separator 32 similar to the previously mentioned separator 8.

The resulting bottom layer comprising water rich in solvent and designated as primary solution is conducted through pipe 33 to the previously mentioned separator 19.

The upper layer comprising extract oil relatively free from solvent containing, for example, about 0.5% solvent) is conducted through a pipe 34 to the lower portion of an extractor 35 wherein it is likewise extracted with hot water at a temperature of about 300° F.

The resulting secondary solution comprising water relatively lean in solvent is drawn off through a pipe 36 and discharged in the previously mentioned tank 14.

The extract oil now free or substantially free from solvent is removed from the top of the extractor 35 through a pipe 37 to a receiving tank 38.

As previously indicated, where the feed oil comprises cracked naphtha this extract oil will usually comprise aromatic hydrocarbons including toluene and in addition will contain olefinic hydrocarbons.

Where it is desired to separate the toluene or a fraction rich in toluene from the extract oil the extract oil is subjected to a subsequent treatment which may involve extraction with a suitable solvent under conditions adapted to selectively separate the toluene. This may be accomplished, for example, by extraction with water at elevated temperature and pressure.

In such case the extract oil is pumped through a heater 39 wherein it is heated to a temperature of about 400 to 600° F. The heated mixture is introduced to the lower portion of a countercurrent extraction tower 40 similar to the previously described extraction tower 2.

A stream of water is conducted from a tank 41 through a heater 42 wherein it is heated to a temperature in the range about 400 to 600° F. and thereafter introduced to the upper portion of the extraction tower 40 in the proportion of about 1 to 12 volumes or more of water to 1 volume of hydrocarbon feed. The water advantageously comprises that discharged from the bottom of the fractionator 15.

The extraction tower 40 is maintained under a pressure which may range from about 1000 to 5000 pounds per square inch gauge, or sufficient to maintain substantially liquid phase conditions within the extraction tower 40.

The water and extract oil are subjected to countercurrent contact within the extraction tower 40. As a result a water phase collects in the bottom of the extraction tower comprising aromatic hydrocarbons dissolved in the bulk of the water while a hydrocarbon phase collects in the upper portion of the extraction tower and comprises non-aromatic hydrocarbons mixed with some water.

The hydrocarbon phase is continuously discharged from the top of the tower through a pipe 43 and cooler 44 to a separating vessel 45. The mixture is advantageously cooled to a temperature of about 70° F. as a result of which the mixture separates into water and hydrocarbon layers, respectively, in the separator 45. The water layer can be continuously discharged from the bottom of the separator 45 and returned all or in part to the tank 41 while the non-aromatic hydrocarbon fraction is continuously discharged from the top of the separator 45.

Likewise, the water phase is continuously withdrawn from the bottom of the extraction tower 40 through a pipe 46, cooler 47 and from there discharged into a separator 48. The water phase is advantageously cooled to a temperature of about 70 to 150° F. so that separation occurs within the separator 48 into layers or phases due to the relative insolubility of the aromatic hydrocarbons in the solvent at the reduced temperature. The aromatic hydrocarbons are discharged through a pipe 49 while the water layer is discharged through a pipe 50 and returned all or in part to the previously mentioned tank 41.

The extraction in the extraction tower 40 may be effected with water containing substantial amounts of furfural or dissolved selective solvent. For example, the extraction medium may comprise water containing about 8 to 15% by weight of furfural. Therefore, instead of using water drawn off from the pipe 16 as the extraction medium a portion of the water solvent mixture discharged from pipe 20 may be used since as already mentioned, the mixture flowing through pipe 20 from the separator 19 comprises water containing about 13% by weight of furfural. A portion of this stream may be diverted through a pipe 51 and thereby conducted to the inlet of the heater 42 wherein it is heated prior to introduction to the extraction tower 40.

While specific operating conditions have been described in connection with the flow diagram it is contemplated that these conditions may be varied depending upon the nature of the oil undergoing treatment and the particular selective solvent employed. It is also contemplated that the specific method of flow may be modified, as for example, to provide additional stages of extraction and/or fractionation.

The feed to the process may comprise naphtha, kerosene and the like or fractions thereof. For example, where the recovery of aromatic hydrocarbons such as toluene from cracked naphtha is of primary interest, selected feeds rich in aromatic hydrocarbons may be used. Thus, the feed may advantageously comprise a naphtha fraction consisting essentially of hydrocarbons having 5 to 7 carbon atoms per molecule.

While application of the process to the treatment of mineral oils has been specifically described, nevertheless it is contemplated that the process may be applied to the treatment of other oils including fatty oils and fatty acids, such as are used in the preparation of foods, soaps, paints, varnishes and enamels. Examples of such other oils include linseed oil, tung oil, soybean oil, cottonseed oil, etc. Numerous other oil substances may be mentioned including fatty acids, fatty acid mixtures and mixtures of fats and oils as well as rosin and rosin oils.

Obviously many modifications and variations of the invention, as hereinbefore set forth, may be made without departing from the spirit and scope thereof, and therefore only such limitations should be imposed as are indicated in the appended claims.

I claim:

1. In a continuous process for extracting aromatic hydrocarbons from a hydrocarbon mixture containing aromatic and non-aromatic constituents including paraffins and naphthenes which comprises extracting the hydrocarbon feed with a selective solvent substantially completely miscible with water in all proportions at elevated temperatures and having the essential selective solvent action of furfural as between paraffins and non-paraffins to form a raffinate phase comprising paraffins and an extract phase comprising non-paraffins dissolved in the bulk of the solvent, separating the resulting phases, subjecting the extract phase to the extractive action of water in sufficient amount to substantially dissolve the solvent thereby forming a primary solution of water and solvent, removing the primary solution, separately subjecting the remaining extract, retaining some solvent, to further extraction with water at elevated temperature to extract remaining solvent therefrom and thereby form a secondary solution of water and solvent, and a secondary extract of extract hydrocarbons, distilling said secondary solution with the aid of steam to form a liquid fraction consisting essentially of water and a distillate fraction of enriched solvent content, passing said distillate to a separating zone maintained at a temperature such that separation into phases occurs, passing said primary solution to the separating zone for phase separation therein in the presence of the said distillate, withdrawing from the separating zone a mixture comprising water lean in solvent, recycling the so withdrawn mixture for mixing with fresh extract phase, separately withdrawing from the separating zone a mixture comprising water rich in solvent, subjecting this solvent rich mixture to distillation to form a liquid fraction consisting essentially of dry solvent and a second distillate fraction comprising solvent and water, passing said second distillate to the separator, passing said secondary extract hydrocarbons to an extraction zone, also passing to said extraction zone the aforesaid liquid fraction consisting essentially of water, subjecting the extract hydrocarbons and water therein to a temperature in the range about 400 to 600° F. and while under elevated pressure sufficient to maintain substantially liquid phase conditions and such that aromatic hydrocarbons are dissolved in the water, removing the water and dissolved aromatics and recovering the aromatics from the removed water.

2. A continuous process for effecting fractional separation of oil by extracting the oil with a substantially water free selective solvent and which solvent is completely miscible in water in all proportions at elevated temperatures comprising subjecting the oil to extraction with the solvent, forming an extract phase comprising a portion of the solvent and constituents of the oil dissolved therein and a raffinate phase comprising another portion of the solvent and constituents of the oil insoluble in the solvent, separating said phases, separately treating said phases with water at elevated temperature and in sufficient amount to substantially dissolve the solvent thereby forming primary solutions of water and solvent, removing and commingling said primary solutions, separately subjecting the remaining extract and raffinate phases each containing some solvent to extraction with water at elevated temperature to extract remaining solvent therefrom and thereby form secondary solutions of water and solvent, commingling said secondary solutions, distilling the commingled secondary solutions with the aid of steam to form a liquid fraction consisting essentially of water and a distillate fraction of enriched solvent content, passing said distillate to a separating zone maintained at a temperature such that phase separation occurs, passing said commingled primary solutions to the separating zone for phase separation therein in the presence of said distillate, withdrawing from the separating zone a mixture of water lean in solvent, recycling the so withdrawn water for mixing with fresh extract and raffinate phases, separately withdrawing from said separating zone a mixture comprising water rich in solvent, subjecting this water-rich mixture to distillation to form a second liquid fraction consisting essentially of dry solvent and a second distillate fraction comprising solvent and water, recycling the second liquid fraction for mixing with fresh feed oil, and commingling said second distillate fraction with the aforesaid distillate of enriched solvent content.

3. A continuous process for effecting fractional separation of oil by extracting the oil with a substantially water-free selective solvent and which solvent is completely miscible in water in all proportions at elevated temperatures comprising subjecting the oil to extraction with the solvent, forming an extract phase comprising a portion of the solvent and constituents of the oil dissolved therein and a raffinate phase comprising another portion of the solvent and constituents of the oil insoluble in the solvent, separating said phases, treating the extract phase with water at elevated temperature and in sufficient amount to substantially dissolve the solvent, thereby forming a primary solution of water and solvent, removing said primary solution, subjecting the remaining extract phase containing some solvent to extraction with water at elevated temperature to extract remaining solvent therefrom and thereby form a secondary solution of water and solvent, distilling the secondary solution with the aid of steam to form a liquid fraction consisting essentially of water and a distillate fraction of enriched solvent content, passing said distillate to a separating zone maintained at a temperature such that phase separation occurs, passing said primary solution to the separating zone for phase separation therein in the presence of said distillate, withdrawing from the separating zone a mixture of water lean in solvent, recycling the so withdrawn water for mixing with fresh extract phase, separately withdrawing from said separating zone a mixture comprising water rich in solvent, subjecting this water rich mixture to distillation to form a second liquid fraction consisting essentially of dry solvent and a second distillate fraction comprising solvent and water, recycling the second liquid fraction for mixing with fresh feed oil and commingling said second distillate fraction with the aforesaid distillate of enriched solvent content.

4. A continuous process for effecting fractional separation of oil by extracting the oil with a substantially water-free selective solvent and which solvent is completely miscible in water in all proportions at elevated temperatures comprising subjecting the oil to extraction with the solvent, forming an extract phase comprising a portion of the solvent and constituents of the oil dissolved therein and a raffinate phase comprising another portion of the solvent and constituents of the oil insoluble in the solvent, separating said phases, treating the raffinate phase with water at elevated temperature and in sufficient amount to substantially dissolve the solvent, thereby forming a primary solution of water and solvent, removing said primary solution subjecting the remaining raffinate phase containing some solvent to extraction with water at elevated temperature to extract remaining solvent therefrom and thereby form a secondary solution of water and solvent, distilling the secondary solution with the aid of steam to form a liquid fraction consisting essentially of water and a distillate fraction of enriched solvent content, passing said distillate to a separating zone maintained at a temperature such that phase separation occurs, passing said primary solution to the separating zone for phase separation therein in the presence of said distillate, withdrawing from the separating zone a mixture of water lean in solvent, recycling the so withdrawn water for mixing with fresh raffinate phase, separately withdrawing from said separating zone a mixture comprising water rich in solvent subjecting this water rich mixture to distillation to form a second liquid fraction consisting essentially of dry solvent and a second distillate fraction comprising solvent and water, recycling the second liquid fraction for mixing with fresh feed oil and commingling said second distillate fraction with the aforesaid distillate of enriched solvent content.

ROBERT E. MANLEY.